Oct. 24, 1961 W. H. MARTIN, JR., ET AL 3,005,265
BEARING INSPECTION TOOL
Filed April 3, 1959 2 Sheets-Sheet 2

INVENTORS.
WADE H. MARTIN Jr. &
WESLEY V. OLDS
BY
Wade Koontz
Arnold H. Cole
ATTORNEYS United States Patent Office 3,005,265
Patented Oct. 24, 1961

3,005,265
BEARING INSPECTION TOOL
Wade H. Martin, Jr., 43652 N. Higbee Ave., and Wesley V. Olds, 44112 N. Date, both of Lancaster, Calif.
Filed Apr. 3, 1959, Ser. No. 804,054
6 Claims. (Cl. 33—174)
(Granted under Title 35, U.S. Code (1952), sec. 266)

The invention described herein may be manufactured and used by or for the United States Government for governmental purposes without payment to us of any royalty thereon.

This invention relates to a ball bearing inspection device and more particularly to a versatile, portable simply operated and accurate tool for measuring the axial play or clearance of large ball bearings, such as may be used in jet engines.

To measure the axial play or clearance of a large ball bearing, suitable for heavy duty, as in the jet engine of an airplane, and measuring up to 11 or more inches in outside diameter, it is necessary to use a device or tool especially devised for the purpose. Such a device must be accurate, should be readily operated by personnel with a minimum of training, portable and easily adapted to bearings of various sizes.

It is the purpose of this invention to supply a device which will meet the above requirements and at the same time permit the rapid checking of bearings before they are put in use.

The above and still other objects, advantages and features of our invention will become apparent upon consideration of the following detailed description of one embodiment thereof, especially when taken in conjunction with the accompanying drawings, in which.

Figure 1:
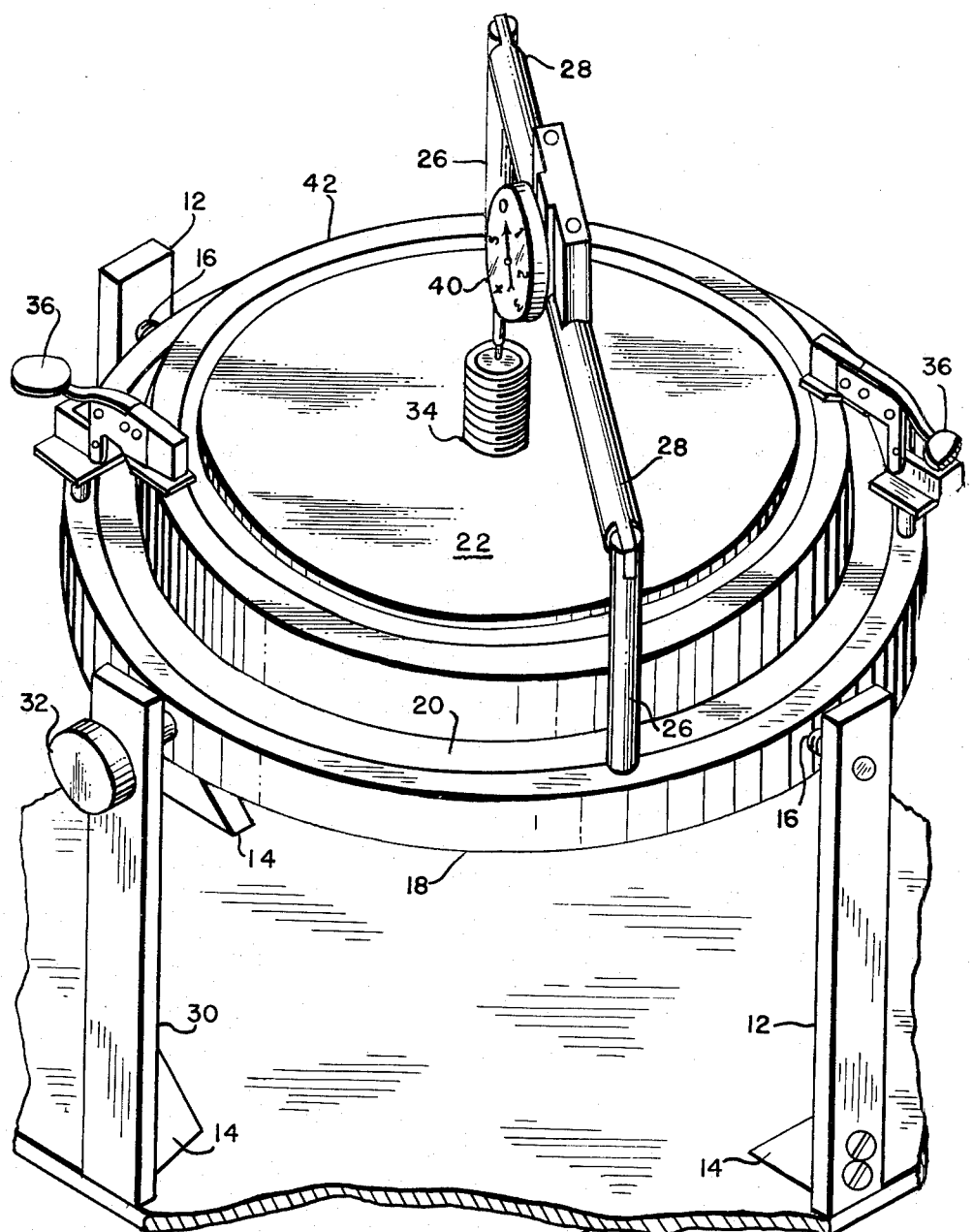
FIG. 1 is an isometric view of the bearing inspection tool assembly in loading position.
Figure 2:
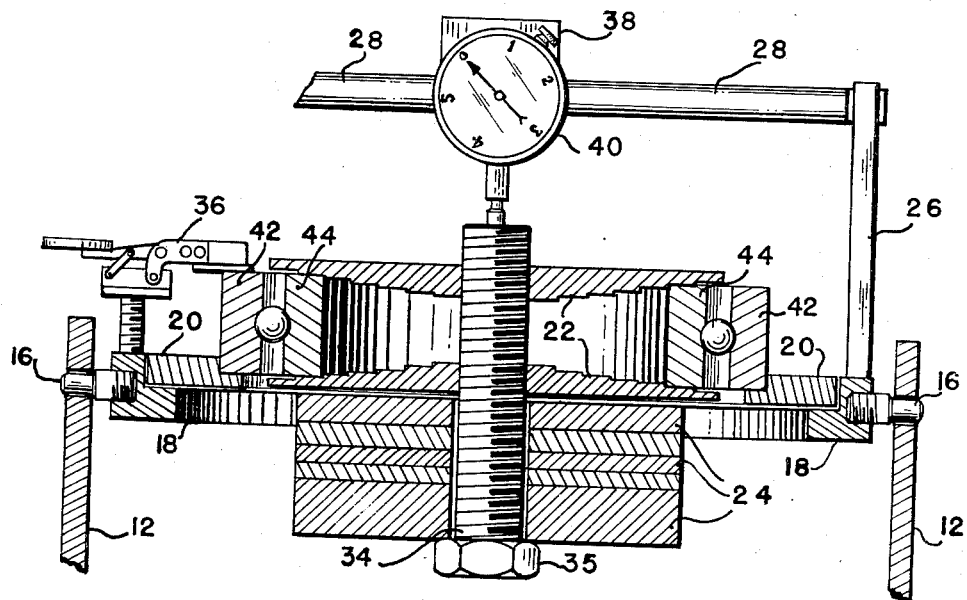
FIG. 2 is a partial cross sectional view showing elements of the invention in loaded position with the setting of the gauge at zero.
Figure 3:
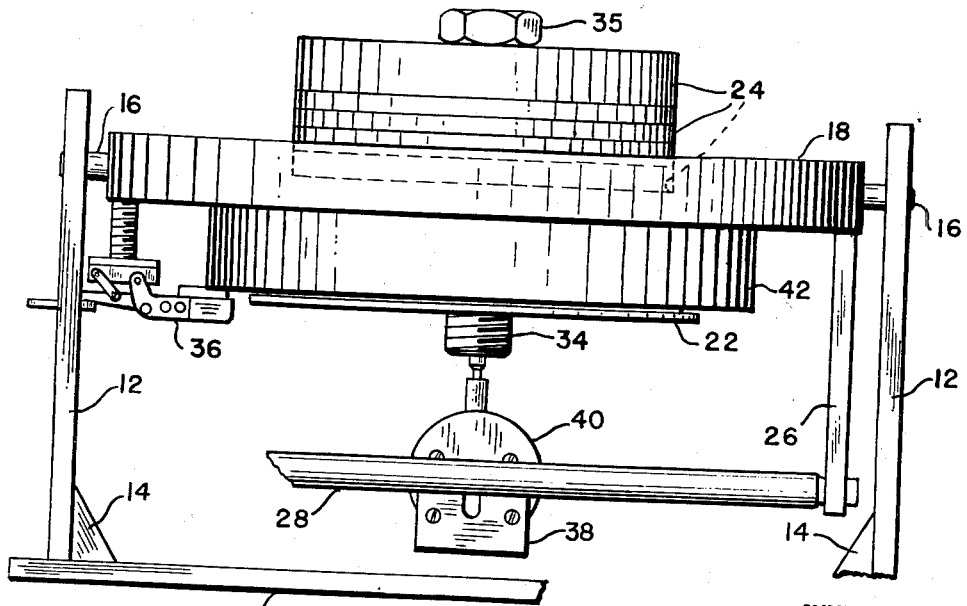
FIG. 3 is a pictorial view showing a bearing being tested with the carrier rotated 180°.

In the drawings the numeral 10 indicates a base plate of any suitable metal, as steel, upon which are two upright supporting standards 12 secured on opposite sides of said plate by braces or gussets 14. The upper ends of said upright standards 12 are journaled to receive bearing studs 16 which are fast to and support seat adapter 18. A ball bearing to be measured having an outer race 42 and an inner race 44, is placed between suitable inner race adapters 22, as shown, and stud 34 is threaded through said adapters to hold the said bearing firmly between them. The assembly thus formed is placed in a bearing adapter 20, of a size to fit the outside race 42 of the ball bearing to be measured. Bearing adapter 20 is then placed in seat adapter 18 and pin lock 32 which is held in lock standard 30, is made fast to said adapter 18 to hold it in place while the weights 24, to simulate the thrust on the bearing in actual use, are placed over the lower end of stud 34 and secured in place with nut 35. Two quick release vises 36, permanently attached to opposite sides of seat adapter 18, are then clamped to the outer race 42 of the bearing to hold it in place. The gauge support 28 is fixed in place in gauge posts 26 and micrometer gauge 40, which is fast to gauge mount 38, which said mount is fastened to said gauge support 28 by screws (not shown), is put in contact with the upper end of stud 34 and adjusted to read zero. When pin lock 32 is released the seat adapter is revolved 180 degrees about an axis through bearing studs 16, thus placing the weights on top of the inner race 44 of the bearing causing a deflection to be registered on the said gauge which is taken as the axial play or clearance of the bearing.

One of the principal uses of this invention will be in a shop where jet engines are being assembled. Its portability makes it possible to test bearings at any convenient location, its simplicity of operation makes it usable by operators with a minimum of training and its accuracy enables a determination of the serviceability of the bearing before installation.

It is to be understood that the above described arrangement is merely illustrative of the application of the principles of the invention. Numerous other arrangements may be devised by those skilled in the art without departing from the spirit and scope of the invention.

What we claim as new is:

1. In a device for measuring the axial play or clearance of a ball bearing, a stand consisting of a metal plate, standards on opposite sides of said plate, an annular means pivotally mounted on said standards to be rotatable about its diameter in said standards, said means providing a seat for an outer race adapter, support means having clamping means thereon for clamping to the inner race of a ball bearing to be measured, said supporting means rigidly supporting a weight coaxially with the inner race means for clamping the outer race of said bearing to said adapter, and a dial indicator gauge mounted in constant contact with the said inner race clamping means.

2. A device as defined in claim 1 wherein said annular means comprises a ring having bearing studs journalled in said standards, a shoulder on one face of said ring providing said seat.

3. A device as defined in claim 2 wherein said adapter comprises another shouldered ring, said other ring seating on the shoulder of the first ring and receiving the outer race on its shoulder.

4. A device as defined in claim 1 wherein the means for clamping the outer race comprises at least one quick release vise mounted on said annular means, said dial indicator gauge also being mounted on said annular means.

5. In a device for measuring the axial play or clearance of a ball bearing, a stand consisting of a metal plate, standards on opposite sides of said plate, an annular means mounted to be rotatable about its diameter in said standards, said means providing a seat for an outer race adapter, means for clamping the inner race of a ball bearing to be measured, said clamping means comprising two identical facing plates threaded to receive a connecting stud, means for supporting a weight coaxially and rigidly with the inner race of said bearing and beneath said clamping means, means for clamping the outer race of said bearing to said adapter, a dial indicator gauge mounted in constant contact with the said inner race clamping means to read the axial play when the said seat is rotated about a diameter 180° to place the said weight above the inner race of said ball bearing.

6. A device as defined in claim 5 wherein each of said plates is formed with a plurality of concentric steps on its facing surface, said steps serving to hold races of different sizes.

References Cited in the file of this patent

UNITED STATES PATENTS

| 1,062,566 | Gohlke | May 20, 1913 |
| 1,491,050 | Lutz | Apr. 22, 1924 |
| 1,597,357 | Godfrey | Aug. 24, 1926 |
| 2,091,022 | Stuart | Aug. 24, 1937 |
| 2,787,905 | Prestipino | Apr. 9, 1957 |

FOREIGN PATENTS

| 151,669 | Sweden | Sept. 27, 1955 |